Figure 1:
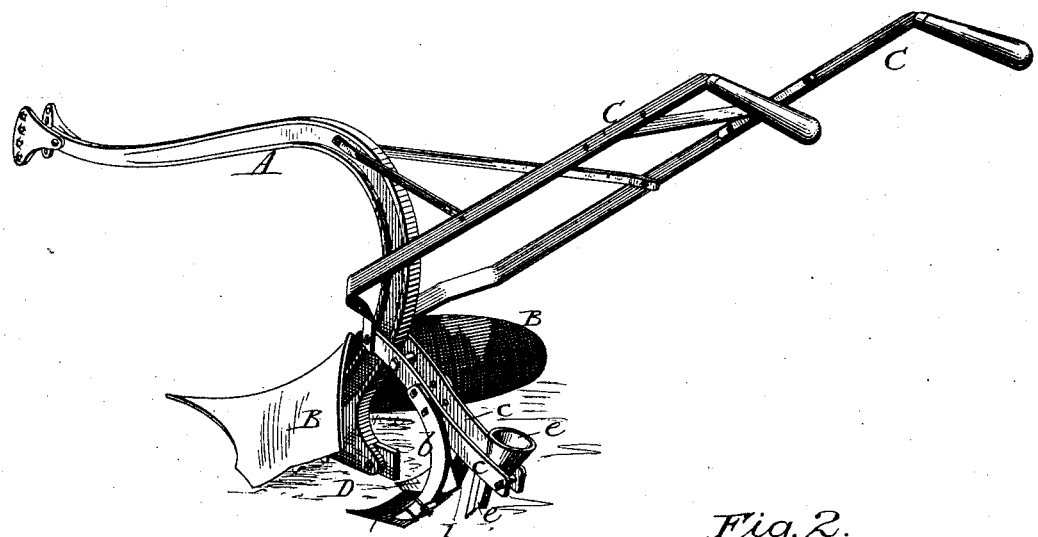

(No Model.)

E. P. LYNCH.
LISTER PLOW.

No. 375,081. Patented Dec. 20, 1887.

NEW PLAN.

OLD FURROW.

Attest:
Sidney P. Hollingsworth
W. R. Kennedy

Inventor:
E. P. Lynch
By his Atty.
Phil. T. Dodge

UNITED STATES PATENT OFFICE.

EDWARD P. LYNCH, OF DAVENPORT, IOWA.

LISTER-PLOW.

SPECIFICATION forming part of Letters Patent No. 375,081, dated December 20, 1887.

Application filed October 14, 1887. Serial No. 252,368. (No model.)

*To all whom it may concern:*

Be it known that I, EDWARD P. LYNCH, of Davenport, in the county of Scott and State of Iowa, have invented certain Improvements in Lister-Plows, of which the following is a specification.

The present invention has reference to so-called "lister-plows" in which a mold-board plow opening a main furrow is commonly followed by a subsoiling device which opens a second furrow centrally in the first to receive the corn or other seed.

In practice it has been found that on level land and lands subjected to flooding, the water flowing through the main furrow will seek the secondary bottom furrow and frequently wash the seed or young plants therefrom.

It is the aim of my invention to obviate this difficulty; and to this end it consists, essentially, in a plow provided with a mold-board or its equivalent, by which the main furrow is opened, and with two subsoiling devices which act in the two sides of the main furrow, throwing the subsoil toward the center and giving the main furrow a greater depth at the sides than at the middle, so that the subsoil is presented at the middle to receive the seed and the water caused to flow to the two sides away from the seed and plants. The details of the plow may be modified at will, provided these characteristic features are retained.

I have represented in the drawings a construction which I recommend for use under ordinary circumstances.

Figure 2:
Figure 3:

In the accompanying drawings, Figure 1 represents a perspective view of my improved plow. Figs. 2 and 3 are sectional views illustrating, respectively, the sectional form of the furrow produced by my implement and that produced by the plows heretofore in use.

Referring to the drawings, A represents an ordinary metal beam, to the front of which the draft animal or animals will be attached, as usual. The rear end of this beam is curved downward and forward and has attached rigidly to it a double mold-board, B, by which the earth is thrown to the right and left, and the main furrow thus formed.

C C are handles, which will be attached in any ordinary manner for the purpose of guiding and controlling the implement.

D D represent two subsoiling devices to which the present invention relates. These subsoiling devices, which may consist of shares or shovels of the form shown, or of any other appropriate form, are arranged in rear of the mold-board and on opposite sides of the longitudinal axis of the beam, or, in other words, on opposite sides of a line passing centrally through the plow. They are located at such distance from each other as to enter opposite sides of the furrow produced by the main plow, and are arranged to enter the earth and deepen said furrow at its two sides, and to throw the subsoil thus loosened inward toward the center, forming a ridge or elevation in the bottom of the main furrow, as shown at $a$, Fig. 2. These shares may be attached rigidly to standard $b$, the upper ends of which may be in turn bolted rigidly to arms $c$, extending backward from the beam. These arms $c$ may support a seed-delivery tube, $e$, which may be combined with a seed-dropping device—such as represented in Letters Patent No. 347,880, granted to me on the 24th day of August, 1886; or any other appropriate seed-distributer may be employed.

Referring to Fig. 2, the dotted lines represent the bottom of the furrow as produced by the mold-board B, and the full lines the form of the furrow after the action of the subsoiling device.

In Fig 3 the dotted lines represent the bottom of the furrow such as is formed by the lister plows heretofore in use, and the full lines the form of such furrow after the action of the central subsoiler.

It will be observed that the furrow produced by my implement differs from that produced by the old, in that it is elevated at the center and deepened at the sides, instead of being deepest at the center.

When my implement is in action, the mold-board first forms the main furrow, as indicated by dotted lines in Fig. 2, after which the subsoiling devices, throwing the subsoil to the center, form the ridge or elevation of soft subsoil to receive the seed, at the same time reproducing the trenches or depressions at the side, as shown at *g*. The seed-dropping device, which is arranged, as shown, in rear of the subsoil devices, may be followed by covering devices of ordinary form, if desired.

I am aware that a mold-board has been followed by three subsoiling devices acting one at each side and the other at the center of the furrow, all in advance of said delivering mechanism, and this I do not claim.

Having thus described my invention, what I claim is—

1. In a lister-plow, the combination of a mold-board to open the main furrow and two subsoiling devices arranged in rear of said mold-board and in position to act in the two sides of its furrow, substantially as described, whereby the main furrow is deepened at its sides and the subsoil formed in a ridge at its middle.

2. In a lister-plow, the combination of the mold-board B, two subsoiling devices, D, located in rear of said mold-board and arranged to throw the earth inward from opposite sides of its furrow, and a seed-dropping device.

In testimony whereof I hereunto set my hand, this 10th day of January, 1887, in the presence of two attesting witnesses.

EDWARD P. LYNCH.

Witnesses:
GEO. H. FRENCH,
JAS. E. LEAHY.